No. 656,569. Patented Aug. 21, 1900.
A. E. OSBORNE.
EDUCATIONAL SYSTEM.
(Application filed Dec. 6, 1899.)
(No Model.)
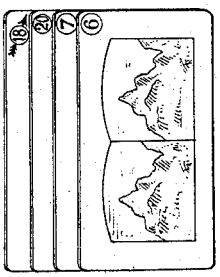
WITNESSES:
INVENTOR:
Albert E. Osborne,
By Attorneys,

UNITED STATES PATENT OFFICE.

ALBERT E. OSBORNE, OF NEW YORK, N. Y., ASSIGNOR TO UNDERWOOD & UNDERWOOD, OF SAME PLACE.

EDUCATIONAL SYSTEM.

SPECIFICATION forming part of Letters Patent No. 656,569, dated August 21, 1900.

Application filed December 6, 1899. Serial No. 739,346. (No model.)

*To all whom it may concern:*

Be it known that I, ALBERT E. OSBORNE, a citizen of the United States, residing in the city, county, and State of New York, have invented certain new and useful Improvements in Educational Systems, of which the following is a specification.

This invention relates to educational systems, and aims to provide improved means especially applicable to geographical instruction or illustration.

Heretofore it has been common to utilize what are known as "trip series of binocular photographs," comprising views of successive portions of a country, city, or locality for illustrating to the observer interesting or conspicuous portions of a locality in such order and manner as these portions could be viewed by a traveler proceeding through such country along a predetermined route or trip. These pictures are numbered or otherwise suitably designated and may be studied in connection with an index or description, the pictures being used in a stereoscope, either in their numerical order or in such order as the wishes of the observer or the suggestions of the description make desirable. By such use of a well-chosen set of stereoscopic views of the character known as "natural" or "life-size" views one is able to attain a familiarity with localities approximating that incident to an actual visit to the place photographed. Such views include all visible objects within certain predetermined lines and frequently cover a range of country which cannot be easily or clearly indicated by an ordinary description or index. In some instances different views will be taken showing different sides of a particular object or district, so that the user may successively view an object from different points. To detect the exact range of view and all objects visible therein on an ordinary map, would be a most difficult if not an impossible operation, and hence it has heretofore been of little advantage to make reference to maps or charts in connection with the use of stereoscopic views for illustrative or educational purposes.

My invention aims to provide an improved system for utilizing stereoscopic or other views for purposes of illustration, entertainment, or education and improved means especially applicable to such system. To this end in carrying out the preferred form of my present improvements I provide an improved map or chart and improved educational or illustrative means comprising a series of illustrations of a country or object, as a series of stereoscopic photographic views thereof, combined with such map or chart, said parts having corresponding provisions for indicating the relations between the photographs and the map, whereby the user may by reference to either a view or to the map at once observe the relation between the two and readily locate the view or views desirable to the illustration of a predetermined locality by examining the map or as easily discern the geography of a locality illustrated in any view by reference to the map, and I preferably provide, in connection with the map and views, an index and additional description having provisions corresponding to those of the map and views for facilitating reference to either or both.

In using my invention in what are known as "trip-pictures" a series of stereoscope-cards illustrating views of a country along a particular trip or line of travel, for use either by tourists or students in geography, I add to the stereoscope-cards a map of the country covered thereby, upon which are indicated by suitable symbols the views included in the several cards. I will now describe this form of my invention with reference to the accompanying drawings, in which—

Figure 1 is a view of a map made according to the preferred form of my invention. Fig. 2 is a view of several of the stereoscope-cards designed to be used in connection with the map shown in Fig. 1. Fig. 3 is a view of the volume of descriptive matter used to describe the views of the stereoscope-cards as now usually published and which may be used in addition to my map-index or which may be omitted without loss of clearness.

Referring to the drawings, A indicates the map; B, a series of binocular photographic views; C, a descriptive index; D, E, and F, identifying or corresponding symbols or provisions on the several parts, and G skylines. The cards, as shown, are numbered in the upper right-hand corner or wherever most convenient. Portions of the map are cut out from the remainder by pairs of converging lines, as indicated by the numerals 16 6 10 14, &c., the point of convergence being indicated by circles containing numbers corresponding to those of the lines whose points of intersection they mark. The numbers on the lines and in the circles indicate the cards 16 6 10, &c., respectively, which contain the corresponding views. The circle indicates the point of view of the observer as he looks through the stereoscope, while the diverging lines indicate the direction and breadth of view covered and approximately the visible distance, and the lines G indicate the skylines. It is obvious that the numbered circles are not necessary, the intersection of the lines marking the point of view definitely; but they catch the eye more quickly and easily. To follow up each of two corresponding lines with the eye to their intersection is more tiresome if there be no special mark to indicate the point; but even that is a great improvement over forming an idea of the point of view by means of a printed description. Those views which are small or of very short range it is sufficient to indicate by the numbered circle alone, the fact that no range-lines are given indicating that the view covers only the point on which the circle stands. This is indicated at the circle numbered 12. The map may be used also in connection with printed descriptions of a route or country or with both pictures and printed description. It serves, in fact, as a graphical index and is useful wherever an index of geographical matter is necessary. The term "descriptive" is used in the claims to include pictorial or otherwise descriptive matter. The manner of indicating the country covered by a particular view is most easily and quickly understood, because of our natural conception of all views as bounded on the sides by lines converging to the eye of the observer, and because of this clearness and simplicity my invention is especially adapted to the teaching of geography, the seeing of a piece of country or of a building or harbor from several points of view fixing a more definite conception of the object in the mind than can be obtained in any other way.

Having now described my invention, what I claim, and desire to secure by Letters Patent, is—

1. A map having thereon provisions indicating which portion of the country may be included in a single view, substantially as set forth.

2. A map having thereon provisions indicating a point of view and which portion of the country is visible from such point, substantially as set forth.

3. A map having thereon provisions indicating which portions of the country may be included in a single view and also the point of observation for such view, substantially as set forth.

4. A map having thereon provisions indicating which portion of the country may be included in a single view, the point of observation, and the direction therefrom, of such view, substantially as set forth.

5. A map having thereon provisions indicating which portion of the country may be included in a single view, and the point of observation, the direction, and the extent of such view, substantially as set forth.

6. A map containing lines indicating the portion of the country which may be included in a single view, substantially as set forth.

7. A map containing a pair of lines indicating the portion of the country which may be included in a single view, substantially as set forth.

8. A map containing a pair of converging lines indicating the portion of the country which may be included in a single view, substantially as set forth.

9. A map containing lines indicating the portion of the country which may be included in a single view, and an additional indicator of the point of observation of such view, substantially as set forth.

10. A map containing a pair of converging lines indicating the portion of the country which may be included in a single view, and an additional indicator of the point of observation for such view, substantially as set forth.

11. A graphical index for use in combination with descriptive matter, consisting of a map, provisions on said map for indicating which portions may be included in single views and reference characters on said indicators, substantially as set forth.

12. A graphical index, for use in combination with descriptive matter, consisting of a map, provisions on said map for indicating which portions may be included in single views and also the points of observation of said views, and corresponding reference characters on corresponding view-indicators and point-of-observation indicators, substantially as set forth.

13. In combination, matter descriptive of a subject, and a map of the same subject, said map containing provisions for indicating which portions may be included in single views, and corresponding reference characters on the descriptive matter and on the map indicating the views described in certain parts of the descriptive matter, substantially as set forth.

14. In combination, a set of "trip-pictures," a map of the country covered thereby, and corresponding provisions on said map and pictures indicating which portion is included in each of the several pictures, substantially as set forth.

15. In combination, a set of "trip-pictures,"

a map of the country covered thereby, and corresponding provisions on said map and pictures indicating which portions are included and the points of view in the several pictures, substantially as set forth.

16. A map having provisions indicating the portions constituting the sky-lines of views in predetermined directions.

17. The combination with a view of a country, of a map of such country having means indicating the sky-lines of such view.

In witness whereof I have hereunto signed my name in the presence of two subscribing witnesses.

ALBERT E. OSBORNE.

Witnesses:
  GEORGE H. FRASER,
  THOMAS F. WALLACE.